United States Patent
Kast et al.

(10) Patent No.: US 10,065,487 B2
(45) Date of Patent: Sep. 4, 2018

(54) METHOD FOR FORMING SEALS ON VEHICLE BODIES

(71) Applicant: CQLT SaarGummi Technologies S.à.r.l., Remich (LU)

(72) Inventors: Christian Kast, Merzig-Brotdorf (DE); Klaus Morawski, Saarbruecken (DE)

(73) Assignee: CQLT SaarGummi Technologies S.à.r.l., Remich (LU)

(*) Notice: Subject to any disclaimer, the term of this patent is extended or adjusted under 35 U.S.C. 154(b) by 222 days.

(21) Appl. No.: 15/103,459

(22) PCT Filed: Nov. 28, 2014

(86) PCT No.: PCT/EP2014/003190
§ 371 (c)(1),
(2) Date: Jun. 10, 2016

(87) PCT Pub. No.: WO2015/096880
PCT Pub. Date: Jul. 2, 2015

(65) Prior Publication Data
US 2016/0311297 A1    Oct. 27, 2016

(30) Foreign Application Priority Data

Dec. 23, 2013  (DE) ......................... 10 2013 114 775

(51) Int. Cl.
*B60J 10/00* (2016.01)
*B23P 19/04* (2006.01)
(Continued)

(52) U.S. Cl.
CPC ............. *B60J 10/45* (2016.02); *B23P 19/047* (2013.01); *B60J 10/84* (2016.02); *B60J 10/86* (2016.02)

(58) Field of Classification Search
CPC .. B60J 10/45; B60J 10/86; B60J 10/84; B23P 19/047
See application file for complete search history.

(56) References Cited

U.S. PATENT DOCUMENTS 6,860,067 B2 * 3/2005 Gearhart ................. B60J 10/00
296/93
6,880,293 B2 * 4/2005 Ishikawa ................... B60J 1/17
49/414

(Continued)

FOREIGN PATENT DOCUMENTS

DE   10 2007 018 792 A1   10/2008
EP      0 857 599 A1        8/1998
(Continued)

OTHER PUBLICATIONS

International Search Report of PCT/EP2014/003190, dated Mar. 11, 2015.
(Continued)

*Primary Examiner* — Richard Chang
(74) *Attorney, Agent, or Firm* — Collard & Roe, P.C.

(57) ABSTRACT

A method for forming seals on vehicle bodies produces by extrusion a sealing material strand to be processed to form a multiplicity of seals, coils the sealing material strand to form a transportable unit, transports the transportable unit to a processing site, and supplies the sealing material strand continuously at the processing site using the transportable unit to a processing device which forms the seals, wherein, within the scope of the processing, a portion of the sealing material strand to be applied to the relevant seal support seat and forming the seal is severed from the sealing material strand in each case. Within the scope of producing the sealing material strand, the sealing material strand portions which in each case form a seal are produced with a cross section changing in the longitudinal direction of the strand, (Continued)

Figure 3:
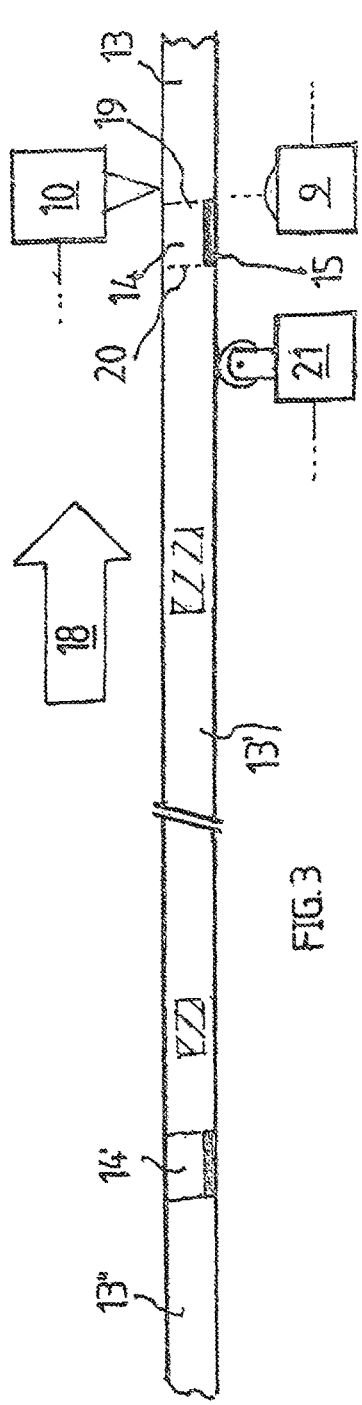

and, within the scope of processing the sealing material strand, separating points which are required for severing the sealing material strand portions which in each case form a seal are determined by detecting markings which are produced on the sealing material strand before the transportable unit is formed and/or by detecting changes in the cross section of the sealing material strand that occur at certain longitudinal positions of the sealing material strand portions.

14 Claims, 3 Drawing Sheets

(51) Int. Cl.
*B60J 10/84* (2016.01)
*B60J 10/86* (2016.01)

(56) References Cited

U.S. PATENT DOCUMENTS

| | | | |
|---|---|---|---|
| 7,748,094 B2 * | 7/2010 | Yamamoto | B23P 19/047 269/21 |
| 7,914,642 B2 * | 3/2011 | Grohmann | B29C 66/91421 156/272.2 |
| 8,052,818 B2 * | 11/2011 | Fenger | B23P 19/047 156/160 |
| 8,475,611 B2 * | 7/2013 | Malecki | B23P 19/047 156/350 |
| 8,656,572 B2 | 2/2014 | Fellner et al. | |
| 9,175,190 B2 * | 11/2015 | Paschmann | B23P 19/047 |
| 9,738,145 B2 * | 8/2017 | Kast | B60J 10/80 |
| 2005/0123718 A1 | 6/2005 | Bester et al. | |

FOREIGN PATENT DOCUMENTS

| | | |
|---|---|---|
| EP | 1 733 839 B1 | 4/2009 |
| EP | 2 419 239 A1 | 2/2012 |
| WO | 2012/004394 A1 | 1/2012 |

OTHER PUBLICATIONS

German Search Report dated Mar. 26, 2014 in DE 10 2013 114 775.5 with English translation of relevant parts.

* cited by examiner

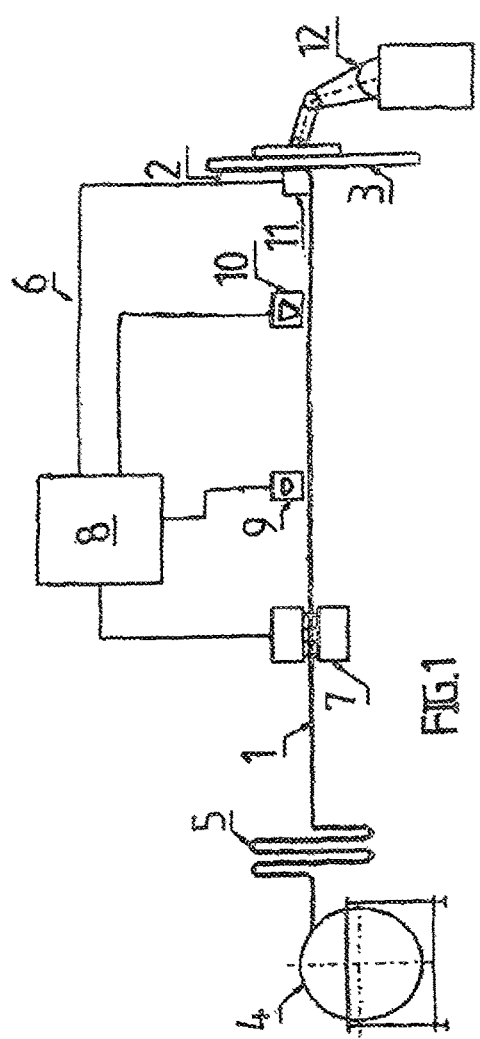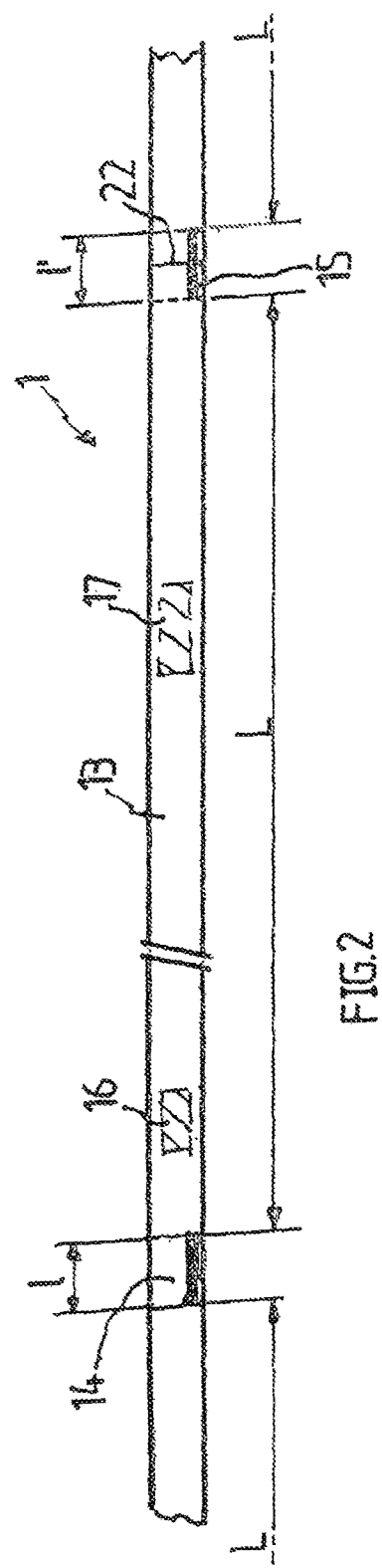

METHOD FOR FORMING SEALS ON VEHICLE BODIES

CROSS REFERENCE TO RELATED APPLICATIONS

This application. is the National Stage of PCT/EP2014/003190filed on Nov. 28, 2014, which claims priority under 35U.S.C. § 119 of German Application No. 10 2013 114 775.5 filed on Dec. 23, 2013, the disclosures of which are incorporated by reference. The international application under PCT article 21(2) was not published in English.

The invention relates to a method for the formation of seals on vehicle bodies, particularly vehicle doors or vehicle door frames, in which a sealing material strand to be processed to form a multiplicity of seals is extruded, the sealing material strand is coiled up or folded up, forming a transportable unit, the transportable unit is transported to a processing location, and the sealing material strand, at the processing location, is continuously passed to a processing device, being pulled out from the transportable unit, wherein during the scope of processing, a segment of the sealing material strand that forms the seal and is to be applied to the seal carrier seat in question is severed from the sealing material strand.

Methods of such a type are known, for example, from EP 1 733 839 B1 and EP 2 419 239 A1. In these known methods, seals are formed on the vehicle at the vehicle manufacturer, not, as until then, by application of sealing material pieces that have been prefinished at a specific length at the sealing material manufacturer, but rather from an extruded sealing material strand supplied in endless manner, from which strand segments are severed within the scope of processing, forming a seal, in each instance.

The invention is based on the task of expanding the application possibilities of such a method.

According to the invention, the sealing material strand segments that form a seal, in each instance, are produced, within the scope of production of the sealing material strand, with a cross-section that changes in the longitudinal strand direction, and, within the scope of the processing of the sealing material strand for severing the sealing material strand sections that form a seal, in each instance, required severing locations are produced with detection of markings that are produced on the sealing material strand before the transportable unit is formed, or/and determined by detection of changes in cross-section of the sealing material strand that occur at specific longitudinal positions of the sealing material strand segments.

Sealing material strands processed according to the state of the art have a constant strand cross-section in the longitudinal strand direction. By means of the invention, the production of seals on vehicle bodies from endlessly supplied sealing material strands is expanded to cover those application cases in which a sealing material strand segment, in each instance, having a cross-section that changes in the longitudinal strand direction is required, for example a sealing material strand segment that is reinforced in specific length regions, for example those provided for being laid around bends. According to the invention, the beginning and the end of the individual sealing material strand segments having a specific change profile of the cross-section in the longitudinal strand direction in each instance are determined using detection of markings that are assigned to a specific longitudinal position, with reference to such a sealing material strand segment. Alternatively or in addition to the determination of the location of the beginning and the end of the individual sealing material strand segments, a specific characteristic cross-section change that occurs in a specific longitudinal position of the respective sealing material strand segments can be detected, for example a change in the outer cross-sectional contour can be determined optically. When the total cross-sectional surface remains the same, changes in the location of material boundaries, for example between harder and softer rubber material, are possible changes in cross-section.

Preferably, within the course of processing of the sealing material strand, the severing locations are furthermore determined using measurements of the advance of the sealing material strand. For example, after detection of a characteristic change in cross-section, the location of which, with reference to the end of the sealing material strand segment, is known, the determination of the severing location takes place at the end of the sealing material strand segment, by means of a comparison of the known distance and the advancing length of the sealing material strand that has been determined continuously.

Preferably, the markings on the sealing material strand are produced during its production, within the course of extrusion, particularly by means of a device installed in the extrusion die or behind the extrusion die in the extrusion direction.

It is practical if the sealing material strand is formed with sealing material strand segments that serve to form a seal, in each instance, which follow one another directly, or with an intermediate segment between the sealing material strand segments, in each instance. The first alternative requires greater precision in the determination of the severing locations, as compared with the second alternative.

As will be explained below, the intermediate segments must be severed during the course of processing of the sealing material strand, as material pieces unsuitable for the formation of a seal, and sorted out as scrap.

Preferably, defective sealing material pieces are cut out from the sealing material strand at the sealing material manufacturer, before the formation of the transportable unit, wherein preferably, only connection abutment points remain as defects of the sealing material strand contained in the transportable unit.

Preferably, cutting out of sealing material pieces takes place to such an extent that defects of the sealing material strand, particularly connection abutment points, come to be placed only in intermediate segments. The intermediate segments can be very short and have only such a length that it can be ensured, within the scope of production tolerances, that no sealing material strand with two abutment points will be processed.

It is practical if markings that reach directly up to the beginning and end of the sealing material strand segments are formed as markings, in each instance. The severing locations can be determined with little effort, in this manner, by means of determining the marking ends.

It is practical if the markings are produced on the intermediate segments and preferably extend over the entire length of the intermediate segments.

In this way, it is ensured that the ends of the markings indicate the beginning of a preceding sealing material strand segment and the beginning of a subsequent sealing material strand segment, in each instance.

The method according to the invention can also be carried out, alternatively, in such a manner that defects of the sealing material strand independent of an intermediate segment are indicated by separate defect markings that differ from the markings. These defect markings then indicate that the sealing material strand piece in question is not suitable for formation of a seal, and must be severed and sorted out at the beginning of the next following sealing material strand segment that is suitable for formation of a seal.

The production of sealing material strands having sealing material strand segments, the cross-section of which changes in the longitudinal strand direction, preferably takes place by means of variation of the extrusion cross-section.

Alternatively, elastomer material that solidifies in a seal cavity can be injected from the outside. It is also conceivable to introduce solid material pieces into the seal cavity, in the extrusion direction, through the extrusion die. Finally, changes in cross-section can also be produced by means of cutting work on extruded strands, for example by means of lasers, water jets or punching tools.

The invention will be explained in greater detail below, using exemplary embodiments and the attached drawings, which refer to these exemplary embodiments. These show:

FIG. 1 a system for the production of seals on vehicle doors, from a sealing material strand that is supplied in endless manner, which system works according to the method according to the invention, FIGS. 2 and 3 representations explaining the processing of a sealing material strand by the system of FIG. 1, and FIG. 4 to 7 further exemplary embodiments of sealing material strands for processing according to the method according to the invention.

A material strand 1 for formation of seals 2 that run around the circumference of vehicle doors 3 is unwound from a transport and supply roll 4, and, by way of a buffer 5, continuously supplied to a processing device 6 that produces the door seals. The vehicle doors 3 are transported to the line and away in cycles, for receiving the seals.

The processing device 6 comprises a transport and guide device 7. The transport and guide device 7 shown in simplified manner, as a block, in FIG. 1, has not only a drive track but also drive and guide rollers distributed over the processing length of the material strand 1, not shown in any detail. The drive and guide device 7 stands in connection with a control device 8 of the processing device 6. The control device 8 can change the advancing speed of the material strand 1, among other things, and stop the advance, if necessary.

In the example shown, the processing device 6 furthermore has a device 9 that optically detects markings applied to the material strand 1 at the strand manufacturer. A further component of the processing device 6 forms a severing device 10 for severing a segment of the material strand 1 that is required for the formation of a seal 2, in each instance. The severing device 10 receives control signals from the control device 8. The control device 8 furthermore controls an application device 11, which applies the segment of the material strand 1 that forms a seal 2, in each instance, to the vehicle door 3 in question, and connects it with the latter, i.e. glues it on. In the example described, a robot 12 holds and moves the vehicle door 3 relative to the application device 11 in such a manner that a sealing ring that runs around the circumference of the vehicle door 3 is formed by means of the continuously applied material strand segment, while the application device 11 remains in place.

It is understood that the application device itself could have a movement device by means of which the strand can be circumferentially connected with a door edge or with the opening edge of a door or of a vehicle hatch.

A first exemplary embodiment of a material strand 1 to be wound onto the supply and transport roll 4 is shown in FIG. 2.

The extruded material strand 1 has periodically recurring strand segments 13 having the length L, which segments each serve to form a seal. An intermediate segment 14, which has a specific length l, in a normal case, is formed between the strand segments 13, in each instance. In the example shown, a marking 15 extends over the entire length of the intermediate segments 14.

The periodically recurring strand segment 13 has a specific length profile of its cross-section. In the example shown, reinforcements 16 and 17 that fill a cavity of the material strand 1 are formed at specific longitudinal positions of the strand segment 13. When the strand segment 13 is installed, these reinforcements 16, 17 come to lie at specific locations of the seal carrier, for example in bend regions.

The reinforcements 16, 17 can be produced in different ways, for example by means of variation of the extrusion cross-section by means of the introduction of material pieces into the extrusion tool, or by means of injection of elastomer material that is capable of flow and solidifies within the cavity of the material strand.

It is practical if the markings 15 are applied during the course of extrusion of the material strand. The material strand 1, which is wound onto the supply and transport roll 4 was examined for defects at the manufacturer of the material strand 1, and defective segments were cut out. Sorting out defective segments took place in. such a manner that the resulting connection abutment points come to lie within the intermediate segments 14. If an intermediate segment 14 contains such a connection abutment point 22, the length 1' of this intermediate segment can deviate from the length 1. Alternatively, with greater effort, sorting out defective segments could also take place in such a manner that intermediate segments having precisely the length 1 are formed. In the latter case, in particular, the marking 15 does not have to extend over the entire length of the intermediate segment 14 as will be explained below.

In the processing of the material strand 1 by the processing device 6, the material strand 1 is advanced by means of the drive and guide device 7, in accordance with the arrow 18 (FIG. 3). An advance measurement device 21 integrated into the drive and guide device 7 records the advance length. When the optical device 9 detects a front end of a marking 15, in the advance direction, the control device 8 activates the severing device 10 after the advance length in question, by which the position of the device 9 and of the severing device 10 differ from one another, has passed through. The severing device 10 then severs the end of the leading strand segment, the front end of which has already been applied to the seal carrier by the application device 11, at 19. In the next processing step, the optical device 9 detects the back end of the marking 15 in question, in the advance direction, and again, by way of the control device 8, triggers activation of the severing device 10, which severs the intermediate segment in question at 20.

In the method of procedure described above, the optical device 9 orients itself on the basis of the marking ends. At a constant length of the intermediate segments 14, a shorter marking is sufficient. The severing location 20 is then determined by way of an advance length measurement.

The subsequent sealing strand 13' can now be processed next, and its back end can be severed in the manner described above, as can the next subsequent intermediate segment 14'.

Figure 4:
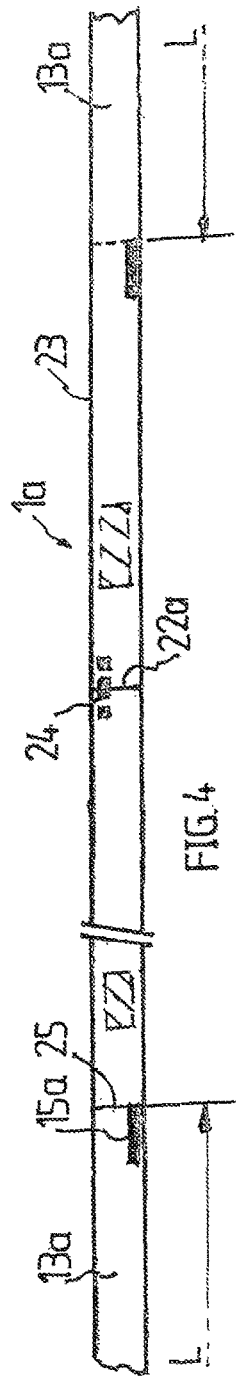

A material strand 1a could also be wound up onto the transport and supply roll 4, as shown in FIG. 4.

A material strand 1a has strand segments 13a that follow one another directly, having a repeating length profile of their cross-section. Each of the strand segments 13a serves for the formation of a seal. At the beginning 25 of each strand segment 13a having the length L, there is a marking 15a. As FIG. 4 shows, the regular sequence of strand segments 13a can be interrupted in that a segment 23 having a connection abutment point 22a is situated between two strand segments 13a. The abutment point 22a was formed after a defective material strand piece was cut out at the material strand manufacturer, and indicated with a marking 24. The processing device 6 recognizes the marking 24, which is interrupted in the longitudinal strand direction, as a defect marking.

In the processing of the strand 1a, the control device 8 recognizes, on the basis of the defect marking 24, that the strand segment 23 in question cannot be used for the production of a seal, and ensures that the segment in question, as it advances further, is not taken up by the application device 11 for processing, but rather is sorted out. The material strand 1 continues to run until the optical device 9 detects the next subsequent marking 15a and brings about severing of the defective segment 23 by way of the control device 8. In a normal case, severing of the strand segment that was processed, in each instance, takes place at the beginning of the marking 15a, in each instance. Of course, the marking could also be applied in such a manner that this takes place at the end of the marking or in a predetermined longitudinal position of the marking.

Figure 5:
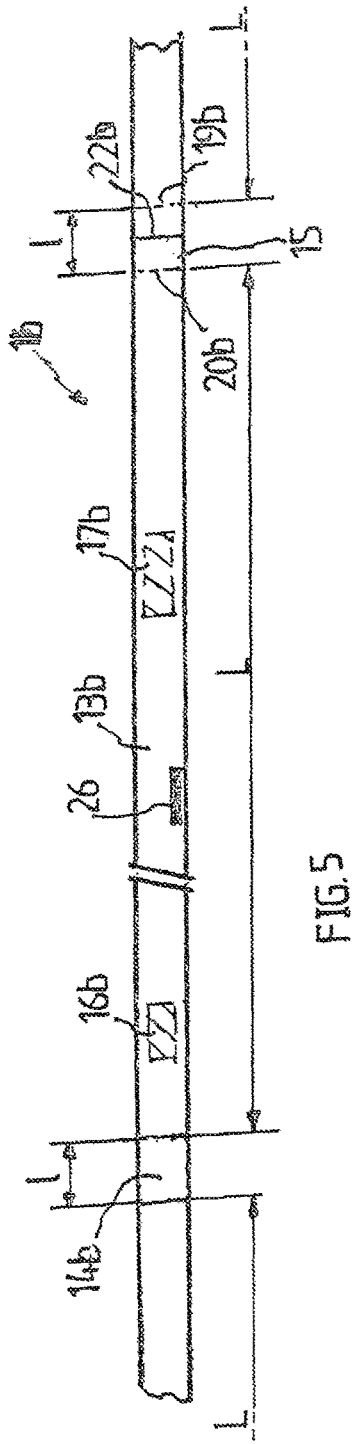

A material strand 1b shown in FIG. 5, having strand segments 13b having a constant length L, for the formation of one seal each, and intermediate segments 14b having a constant length l, has only a single marking 26 per strand segment 13b. The marking 26 is situated at a predetermined longitudinal position of the strand segment 13b. In the processing of the material strand 1b, the optical device 9 detects this marking. Proceeding from its longitudinal position and the known length l of the intermediate segments 14b, the respective severing locations 19b and 20b are determined on the basis of an advance length measurement using the advance measurement device 21.

Instead of the marking 26, the optical device could also determine a prominent outer cross-sectional shape of the longitudinal cross-sectional profile of the strand segment 13b that occurs at a specific longitudinal position.

Figure 6:
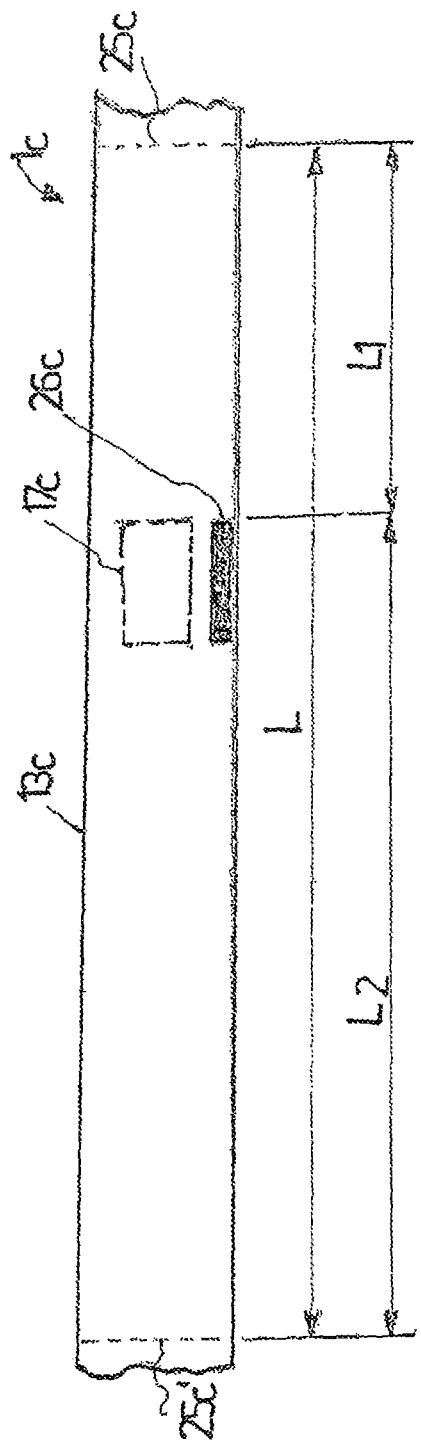
Figure 7:
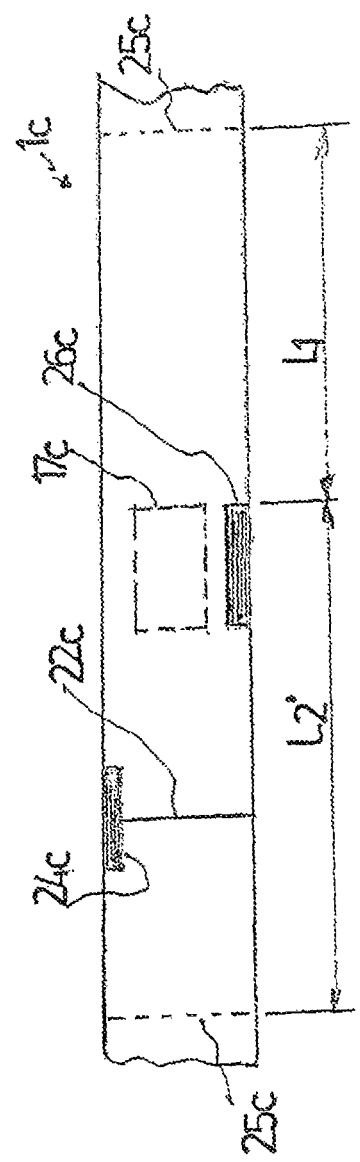

FIGS. 6 and 7 show a particularly preferred exemplary embodiment of a material strand 1c, which has periodically recurring material strand segments 13c having the length L, each serving for the formation of a seal, with a reinforcement 17c in a specific longitudinal position of the material strand 13c. There is a marking 26c at the reinforcement 17c. The front end of the marking 26c, in the advance direction, has the distance L1 from the front end 25c of the material strand segment 13c and the distance L2 from the back end 25c' of the material strand segment 13c.

If the aforementioned device 9 detects the front end of the marking 26c, in the advance direction, for example, then the respective advance coordinates of the beginning 25c and of the end 25c' of the material strand segment 13c are known at this detection time point. Further changes of the advance coordinates can be determined using the aforementioned advance measurement device 21. In particular, the time points at which the beginning and end of the material strand segment 13c reach the position of the aforementioned severing device 10 can be determined.

According to. Fig 7, the periodicity of the material strand 1c is disrupted as the result of an abutment connection 22c. The abutment connection was formed at the manufacturer of the material strand 1c, within the scope of an examination and sorting out of a defective strand region. A. separate defect marking 24c, which is disposed on the strand in a different position from the marking 26c, on the strand circumference, in this exemplary embodiment, faces toward the abutment connection 22c.

If the aforementioned device 9 or a separate device for detection of such a defect marking 24c detects a defect marking 24c within an advance length L1 or L2, behind a marking 26c, then the material strand region in question does not get processed, up to the front end of the next subsequent intact material strand segment 13c, and is sorted out before it is taken up by the application device 11.

In a further embodiment of a sealing material strand to be processed in endless manner, having markings 26 that indicate a sealing material strand segment for the formation of a seal, in each instance, defect markings such as the marking 24c can also be eliminated entirely.

This is because defective strand parts of the sealing material strand, which are unsuitable for the formation of a seal and contain an abutment connection that remains after defective strand parts have been sorted out by the manufacturer, for example, can already be detected solely by the fact that the periodicity of the markings has been disrupted. A distance between two markings that deviates from the length L clearly indicates such a defect, as long as it is avoided, during sorting out of defective strand parts by the manufacturer, that strand parts having precisely the length L or a whole-number multiple of it are sorted out. The length of the sorted-out strand part must deviate from this length so clearly that the periodicity is recognizably cancelled out.

If, during the course of processing of the sealing material strand 1c, using the device 9 and the advance measurement device 21 (as well as using the control device 8), a distance between two markings that is not equal to L is determined, then a strand part, the front end of which, in the advance direction, lies at a distance L1 from the front marking question, in the advance direction, and the back end of which lies at a distance L2 from the back marking in question, of the two markings, in the advance direction, is sorted out.

It is understood that the characteristics of the sealing material strands 1, 1a, 1b, 1c described above can be combined with one another. Aside from a determination of the severing locations on the basis of disruptions of the periodicity of the occurrence of the markings 15, 15a, 26, 26c that indicated the occurrence of a sealing material strand segment 13, 13a, 13b, 13c, in each instance, defect markings 24, 24c can additionally be used to determine severing locations. Such defect markings can be differentiated from the markings 15, 15a, 26, 26c that indicate the sealing material strand segments 13, 13a, 13b, 13c, in different ways, for example by means of the position on the circumference of the strand or the manner of the graphic representation.

In a particular embodiment, liner connection bridges, which must be formed at connection abutment points of a sealing material strand that has an adhesive surface covered by a liner, can serve as defect markings.

The markings that serve to indicate the periodically recurring sealing material strand segments can be modified in the event of the occurrence of defects, and can contain a graphic indication, for example, that a connection abutment point is situated ahead of or behind the marking, in the advance direction. Such modifications are possible if the marking is not produced directly during the course of extrusion but rather during the course of examination of the extruded material at the sealing material strand manufacturer.

The invention claimed is:

1. A method for forming a plurality of seals on vehicle bodies (3), the method comprising:
   extruding a sealing material strand (1) to be processed to form the seals (2),
   coiling up or folding up the sealing material strand (1) to form a transportable unit (4),
   transporting the transportable unit (4) to a processing location, and
   continuously passing the sealing material strand (1) at the processing location to a processing device (6), the sealing material strand being pulled out from the transportable unit,
   wherein during processing, a plurality of sealing material strand segments are severed from the sealing material strand (1), each sealing material strand segment forming a respective seal (2) to be applied to a respective seal carrier seat,
   wherein the sealing material strand segments (13) are produced with a cross-section that changes in the longitudinal strand direction, and, during the processing of each sealing material strand (1), respective severing locations (19, 20) are produced by at least one of detection of markings (15; 26; 24) produced on the sealing material strand before the transportable unit is formed and detection of changes in cross-section of the sealing material strand (1) that occur at specific longitudinal positions of the sealing material strand segments (13).

2. The method according to claim 1, wherein the severing locations (19, 20; 25) are furthermore determined using measurements of advancement of the sealing material strand (1).

3. The method according to claim 1, wherein the markings (15; 26; 24) on the sealing material strand (1) are produced during extrusion of the sealing material strand.

4. The method according to claim 1, wherein the sealing material strand (1) is formed with sealing material strand segments (13a, c) that serve to form a seal (2), in each instance, which directly follow one another, or with an intermediate segment (14) between the sealing material strand segments (13), in each instance.

5. The method according to claim 1, wherein during the processing of the sealing material strand (1) to form a seal (2), unsuitable sealing material strand parts (14; 23) are severed and sorted out as scrap.

6. The method according to claim 1, wherein defective sealing material pieces are cut out from the sealing material strand (1) before forming the transportable unit (4).

7. The method according to claim 6, wherein cutting out of the defective sealing material pieces takes place to such an extent that defects of the sealing material strand (1) come to be placed only in intermediate segments (14).

8. The method according to claim 7, wherein markings (15) that reach directly up to a beginning and an end of the sealing material strand segments (13) are formed, in each instance.

9. The method according to claim 8, wherein the markings (15) are produced on the intermediate segments (14) and extend over the entire length of the intermediate segments (14).

10. The method according to claim 8,
    wherein the sealing material strand (1) is formed with sealing material strand segments (13a, c) that serve to form a seal (2), in each instance, with an intermediate segment (14) between the sealing material strand segments (13), in each instance, and
    wherein defects of the sealing material strand independent of a respective intermediate segment (14) are indicated by separate defect markings (24) that differ from the markings (15).

11. The method according to claim 8, wherein the markings (26b, c) are provided in a specific longitudinal position of the sealing material strand segments (13b, c), in each instance.

12. The method according to claim 11, wherein before forming the transportable unit, defective sealing material strand segments are sorted out, exclusively with disruption of the periodicity of the markings (26c).

13. The method according to claim 12, wherein during the processing of the sealing material strand, defective sealing material parts are determined and sorted out, exclusively on the basis of the disruption of periodicity.

14. The method according to claim 1, wherein changes in cross-section in the longitudinal strand direction of the sealing material strand (1) are formed by at least one of variation of an extrusion gap and injection of an elastomer material that solidifies in a seal cavity.

* * * * *